(12) United States Patent
Choi et al.

(10) Patent No.: US 12,544,411 B2
(45) Date of Patent: Feb. 10, 2026

(54) PHARMACEUTICAL COMPOSITION FOR PREVENTING OR TREATING CANCER, COMPRISING WEISSELLA CIBARIA WIKIM28 AS ACTIVE INGREDIENT

(71) Applicant: KOREA FOOD RESEARCH INSTITUTE, Jeollabuk-do (KR)

(72) Inventors: Hak Jong Choi, Gwangju (KR); Mi Sun Yun, Gwangju (KR)

(73) Assignee: KOREA FOOD RESEARCH INSTITUTE, Wanju-Gun (KR)

( * ) Notice: Subject to any disclaimer, the term of this patent is extended or adjusted under 35 U.S.C. 154(b) by 228 days.

(21) Appl. No.: 17/312,598

(22) PCT Filed: Nov. 29, 2019

(86) PCT No.: PCT/KR2019/016747
§ 371 (c)(1),
(2) Date: Jun. 10, 2021

(87) PCT Pub. No.: WO2020/122484
PCT Pub. Date: Jun. 18, 2020

(65) Prior Publication Data
US 2022/0031774 A1 Feb. 3, 2022

(30) Foreign Application Priority Data
Dec. 10, 2018 (KR) .......................... 10-2018-0158672

(51) Int. Cl.
| | | |
|---|---|---|
| A61K 35/744 | (2015.01) | |
| A23K 10/18 | (2016.01) | |
| A23L 33/00 | (2016.01) | |
| A23L 33/135 | (2016.01) | |
| A61P 35/00 | (2006.01) | |

(52) U.S. Cl.
CPC ............ *A61K 35/744* (2013.01); *A23K 10/18* (2016.05); *A23L 33/135* (2016.08); *A23L 33/40* (2016.08); *A61P 35/00* (2018.01); *A23V 2002/00* (2013.01)

(58) Field of Classification Search
CPC ..... A61K 35/744; A23K 10/18; A23L 33/135; A23L 33/40; A61P 35/00
See application file for complete search history.

(56) References Cited

FOREIGN PATENT DOCUMENTS

| KR | 10-2010-0074928 A | 7/2010 |
|---|---|---|
| KR | 10-2016-0023457 A | 3/2016 |
| KR | 10-1667496 B1 | 10/2016 |

(Continued)

OTHER PUBLICATIONS

Mak et al (Am J Transl Res 2014;6(2):114-118) (Year: 2014).*

(Continued)

*Primary Examiner* — Melenie L Gordon
*Assistant Examiner* — John Paul Selwanes
(74) *Attorney, Agent, or Firm* — Sughrue Mion, PLLC

(57) ABSTRACT

The present invention relates to a novel *Weissella cibaria* WIKIM28 (Accession No. KCCM11879P) isolated from kimchi and a composition comprising the same as an active ingredient. *Weissella cibaria* WIKIM28 according to the present invention shows excellent anti-cancer activity in animal models in which a cancer cell is transplanted, and therefore it can be usefully used as a composition in use of treatment, prevention or improvement of cancer of humans or animals.

4 Claims, 3 Drawing Sheets
Specification includes a Sequence Listing.

(56) References Cited

FOREIGN PATENT DOCUMENTS

| KR | 10-1834383 B1 | 3/2018 |
| KR | 10-2018-0054029 A | 5/2018 |
| RU | 2 547 172 C1 | 4/2015 |

OTHER PUBLICATIONS

Marshall A. Lichtman, A Bacterial Cause of Cancer: An Historical Essay, The Oncologist, vol. 22, Issue 5, May 2017, pp. 542-548, https://doi.org/10.1634/theoncologist.2017-0007 (Year: 2017).*

Landgraf, Marietta et al. "Rational Design of Mouse Models for Cancer Research." Trends in biotechnology (Regular ed.) 36.3 (2018): 242-251. Web. (Year: 2018).*

Wan, Yichao et al. "Indole: A Privileged Scaffold for the Design of Anti-Cancer Agents." European journal of medicinal chemistry 183 (2019): 111691-111691. Web. (Year: 2019).*

Rashid, Haroon ur et al. "Research Advances on Anticancer Activities of Matrine and Its Derivatives: An Updated Overview." European journal of medicinal chemistry 161 (2019): 205-238. Web. (Year: 2019).*

Ireson, Christopher R et al. "The Role of Mouse Tumour Models in the Discovery and Development of Anticancer Drugs." British journal of cancer 121.2 (2019): 101-108. Web. (Year: 2019).*

NCBI, Genbank accession No. KU555931.1 (Jun. 30, 2016).

Kwak, S. H., et al., "Cancer preventive potential of kimchi lactic acid bacteria (*Weissella cibaria, Lactobacillus plantarum*)", Journal of Cancer Prevention, 2014.12, pp. 253-258, vol. 19, No. 4.

International Search Report of PCT/KR2019/016747 dated Mar. 24, 2020 [PCT/ISA/210].

Seul Ki Lim et al., "Weissella cibaria WIKIM28 ameliorates atopic dermatitis-like skin lesions by inducing tolerogenic dendritic cells and regulatory T cells in BALB/c mice", Scientific Reports, 2017, vol. 7, No. 40040, pp. 1-9 (9 pages).

* cited by examiner

SEQUENCE LISTING

<160> NUMBER OF SEQ ID NOS: 1

<210> SEQ ID NO 1
<211> LENGTH: 1508
<212> TYPE: DNA
<213> ORGANISM: Weissella cibaria WIKIM28

<400> SEQUENCE: 1

```
ggatgacgct ggcggcgtgc ctaatacatg caagtcgaac gctttgtggt tcaactgatt      60
tgaagagctt gctcagatat gacgatggac attgcaaaga gtggcgaacg ggtgagtaac     120
acgtgggaaa cctacctctt agcaggggat aacatttgga aacagatgct aataccgtat     180
aacaatagca accgcatggt tgctacttaa aagatggttc tgctatcact aagagatggt     240
cccgcggtgc attagttagt tggtgaggta atggctcacc aagacgatga tgcatagccg     300
agttgagaga ctgatcggcc acaatgggac tgagacacgg cccatactcc tacgggaggc     360
agcagtaggg aatcttccac aatgggcgaa agcctgatgg agcaacgccg cgtgtgtgat     420
gaagggtttc ggctcgtaaa acactgttgt aagagaagaa tgacattgag agtaactgtt     480
caatgtgtga cggtatctta ccagaaagga acggctaaat acgtgccagc agccgcggta     540
atacgtatgt tccaagcgtt atccggattt attgggcgta aagcgagcgc agacggttat     600
ttaagtctga agtgaaagcc ctcagctcaa ctgaggaatt gctttggaaa ctggatgact     660
tgagtgcagt agaggaaagt ggaactccat gtgtagcggt gaaatgcgta gatatatgga     720
agaacaccag tggcgaaggc ggctttctgg actgtaactg acgttgaggc tcgaaagtgt     780
gggtagcaaa caggattaga taccctggta gtccacaccg taaacgatga gtgctaggtg     840
tttgagggtt tccgccctta agtgccgcag ctaacgcatt aagcactccg cctggggagt     900
acgaccgcaa ggttgaaact caaaggaatt gacggggacc cgcacaagcg gtggagcatg     960
tggtttaatt cgaagcaacg cgaagaacct taccaggtct tgacatccct tgacaactcc    1020
agagatggag cgttcccttc ggggacaagg tgacaggtgg tgcatggttg tcgtcagctc    1080
gtgtcgtgag atgttgggtt aagtcccgca acgagcgcaa cccttattac tagttgccag    1140
catttagttg ggcactctag tgagactgcc ggtgacaaac cggaggaagg tggggatgac    1200
gtcaaatcat catgcccctt atgacctggg ctacacacgt gctacaatgg cgtatacaac    1260
gagttgccaa cccgcgaggg tgagctaatc tcttaaagta cgtctcagtt cggattgtag    1320
gctgcaactc gcctacatga agtcggaatc gctagtaatc gcggatcagc acgccgcggt    1380
gaatacgttc ccgggtcttg tacacaccgc ccgtcacacc atgagagttt gtaacaccca    1440
aagccggtgg ggtaaccttc gggagccagc cgtctaaggt gggacagatg attagggtga    1500
agtctaca                                                             1508
```

PHARMACEUTICAL COMPOSITION FOR PREVENTING OR TREATING CANCER, COMPRISING WEISSELLA CIBARIA WIKIM28 AS ACTIVE INGREDIENT

CROSS REFERENCE TO RELATED APPLICATIONS

This application is a National Stage of International Application No. PCT/KR2019/016747 filed Nov. 29, 2019, which claims priority to Korean Patent Application No. 10-2018-0158672 filed on Dec. 10, 2018, the entire disclosures of which are incorporated herein by reference.

TECHNICAL FIELD

The present invention relates to a composition for prevention or treatment of cancer comprising *Weissella cibaria* WIKIM28 (Accession No. KCCM11879P) isolated from kimchi as an active ingredient.

BACKGROUND ART

Cancer shows a high mortality rate worldwide, and is the most common cause of death after cardiovascular disease in Western societies. In particular, due to westernization of dietary habits, the intake of high-fat diets has become common, and because of a rapid increase in environmental pollutants and an increase in alcohol consumption, and the like, colon cancer, breast cancer, prostate cancer and the like continue to increase, and lung cancer is increasing due to an increase of smoking population and air pollution in addition to aging of the population. In this situation, creation of anti-cancer substances which can contribute to enhancement of human health, improvement of healthy quality of life and improvement of human health, by enabling early prevention and treatment of cancer is urgently required.

Meanwhile, lactic acid bacteria are widely distributed in mouth, intestine, vagina and feces of humans and animals and fermented foods such as kimchi, and are closely related to the health of humans and animals. Lactic acid bacteria show various health promotion effects such as intestinal regulation, inhibition of harmful bacteria, immunoregulation, lowering of cholesterol in blood, anti-cancer activity, and the like.

Currently, Korean Patent Publication No. 10-2015-0068061 discloses the anti-cancer activity of *Lactobacillus plantarum* PNU (KCCM11352P) or *Lactobacillus mesenteroides* PNU (KCCM11353P), and Korean Patent No. 10-1287120 discloses a pharmaceutical composition for treatment of cancer containing *Lactobacillus plantarum* DSR CK10 [Accession No.: KFCC-11433P] or *Lactobacillus plantarum* DSR M2[Accession No.: KFCC-11432P] as an active ingredient, but the anti-cancer activity and superiority of *Weissella cibaria* have not been reported.

DISCLOSURE

Technical Problem

An object of the present invention is to provide a pharmaceutical composition for prevention or treatment of cancer comprising *Weissella cibaria* strain as an active ingredient.

In addition, other object of the present invention is to provide a food composition or food additive composition for prevention or improvement of cancer comprising a novel kimchi lactic acid bacterium, *Weissella cibaria* strain as an active ingredient.

Furthermore, other object of the present invention is to provide a feed composition or feed additive composition for prevention or improvement of cancer comprising a novel kimchi lactic acid bacterium, *Weissella cibaria* strain as an active ingredient.

Technical Solution

Accordingly, the present inventors have tried to find a lactic acid bacteria strain that exhibits excellent effects as a probiotic and shows effects of prevention and treatment of cancer from kimchi, have isolated and identified a lactic acid bacteria strain having anti-cancer activity, *Weissella cibaria* WIKIM28, thereby completing the present invention.

In order to achieve the objects, the present invention provides a pharmaceutical composition for prevention or treatment of cancer comprising *Weissella cibaria* WIKIM28 (accession number KCCM11879P) or its culture as an active ingredient.

Furthermore, the present invention provides a food composition or food additive composition for prevention of improvement of cancer comprising *Weissella cibaria* WIKIM28 (accession number KCCM11879P) or its culture as an active ingredient.

Moreover, the present invention provides a feed composition or feed additive composition for prevention or improvement of cancer of livestock comprising *Weissella cibaria* WIKIM28 (accession number KCCM11879P) or its culture as an active ingredient.

Advantageous Effects

*Weissella cibaria* WIKIM28 according to the present invention shows excellent anti-cancer activity in conventional animal models and animal models in which a human cancer cell is transplanted, and therefore it can be usefully used as a composition in use of treatment, prevention or improvement of cancer of humans or animals.

MODE FOR INVENTION

Figure 1:
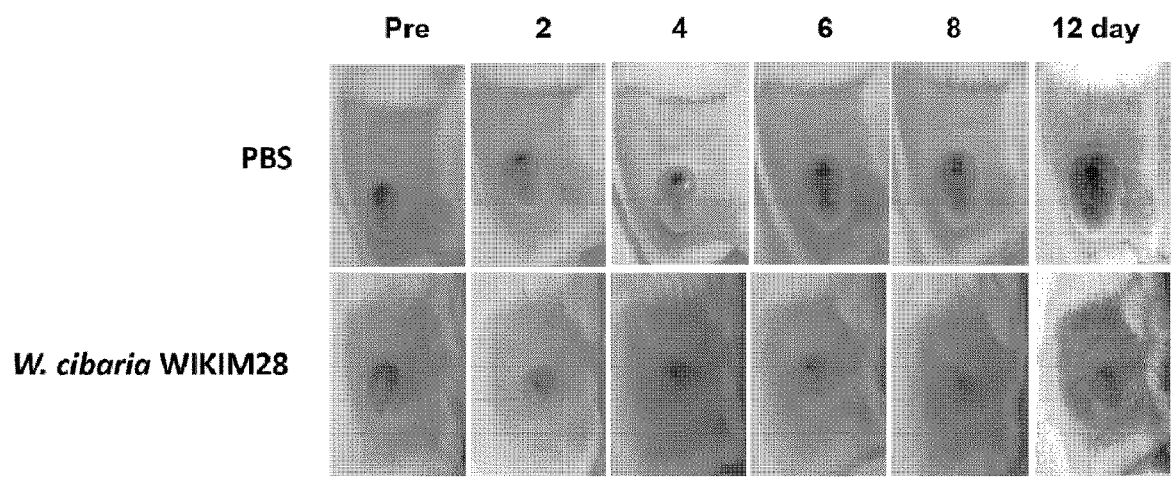
FIG. 1 is a drawing which shows a photograph of a tumor part of a mouse for observing that the size of tumor cells changes over time after intravenous injection of the composition according to the present invention into CT26 cell transplanted mice as compared to the negative control group where phosphate buffered saline (PBS) was injected.

Hereinafter, the present invention will be described in more detail by examples. These examples are only intended to illustrate the present invention more specifically, and it will be obvious to those skilled in the art that the scope of the present invention is not limited by these samples according to the gist of the present invention.

The composition comprising *Weissella cibaria* WIKIM28 (Accession No. KCCM11879P) or its culture as an active ingredient of the present invention has an effect of prevention or treatment of cancer, and may be used as a pharmaceutical composition.

The *Weissella cibaria* WIKIM28 is a kimchi-derived lactic acid bacterium derived from kimchi. Although *Weissella cibaria* WIKIM28 of the present invention is isolated and identified from kimchi, but the means of acquiring is not limited thereto.

As the result of 16S rDNA sequencing for identification and classification of the *Weissella cibaria* WIKIM28, it is shown that it has the nucleic acid sequence of SEQ ID NO: 1.

Accordingly, the microorganism of the present invention which has the 16S rDNA sequence of SEQ ID NO: 1 is named *Weissella cibaria* WIKIM28, and deposited to Korean Culture Center of Microorganisms on Oct. 8, 2015 (Accession number KCCM11879P).

The *Weissella cibaria* WIKIM28 of the present invention has a general intestinal regulation effect and an immune stimulating effect of lactic acid bacteria as a probiotic. It is a well-known fact that *Lactobacillus* sp. lactic acid bacteria have an intestinal regulation effect and an immune stimulating effect.

Herein, 'probiotics' are understood to mean living microorganisms that have a beneficial effect on health of the host by improving the host's intestinal microbial environment in the gastrointestinal tract of animals including humans. Probiotics are living microorganisms with probiotic activity and are in the form of single or complex strains, and when fed to humans or animals in the form of dried cells or fermented products to humans or animals, they can have a beneficial effect on the intestinal flora of the host.

The cancer may be any one selected from the group consisting of bladder cancer, breast cancer, melanoma, thyroid cancer, parathyroid cancer, rectal cancer, throat cancer, laryngeal cancer, esophageal cancer, pancreatic cancer, stomach cancer, tongue cancer, skin cancer, brain tumor, uterine cancer, gallbladder cancer, oral cancer, colon cancer, anal region cancer, liver cancer, lung cancer and colorectal cancer, and preferably, it may be colorectal cancer, but not limited thereto.

The *Weissella cibaria* WIKIM28 comprised in the composition according to the present invention may be present as a live cell or dead cell, and in addition, it may be present in a dried or freeze-dried form. Forms and formulation methods of lactic acid bacteria suitable for inclusion in various compositions are well known to those skilled in the art.

The composition may be administered orally or parenterally. In case of parenteral administration, it may be administered by intravenous injection, subcutaneous injection, intramuscular injection, intraperitoneal injection, endothelial administration, local administration, intranasal administration and rectal administration, and the like, and preferably, it may be administered by intravenous injection, but not limited thereto.

The appropriate dose of the present invention may be prescribed in various ways depending on factors such as formulation method, patient's age, body weight, gender, pathological condition, food, administration time, administration route, excretion rate and response sensitivity.

When the composition of the present invention is utilized as a pharmaceutical composition, the pharmaceutical composition of the present invention may be prepared by using a pharmaceutically appropriate and physiologically acceptable adjuvant in addition to the active ingredient, and as the adjuvant, an excipient, disintegrating agent, sweetener, binding agent, coating material, expansion agent, lubricant, glidant or flavoring agent, or the like may be used.

The pharmaceutical composition may be preferably formulated as a pharmaceutical composition by additionally comprising one or more kinds of pharmaceutically acceptable carriers in addition to the described active ingredient for administration.

For example, for formulation in a form of a tablet or capsule, the active ingredient may be bound to an oral and non-toxic, pharmaceutically acceptable inactive carrier, such as ethanol, glycerol, water and the like. In addition, when desired or needed, a suitable binding agent, a lubricant, a disintegrating agent and a coloring agent may also be comprised in the mixture. The suitable binding agent is not limited thereto, but includes starch, gelatin, natural sugars such as glucose or beta-lactose, natural and synthetic gum such as corn sweetener, acacia, tragacanth or sodium oleate, sodium stearate, magnesium stearate, sodium benzoate, sodium acetate, sodium chloride, and the like. The disintegrating agent is not limited thereto, but includes starch, methyl cellulose, agar, bentonite, xanthan gum, and the like. As the pharmaceutically acceptable carrier in the composition to be formulated as a liquid solution, saline solution, sterile water, Ringer's solution, buffered saline solution, albumin injection solution, dextrose solution, maltodextrin solution, glycerol, ethanol and a mixture of one or more components among them may be used, and if necessary, other common additive such as an anti-oxidant, buffer solution, a bacteriostatic agent, and the like may be added. In addition, it may be formulated as a formulation for injection such as aqueous solution, suspension, emulsion, etc., pill, capsule, granule or tablet, by additionally adding a diluent, a dispersing agent, a surfactant, a binding agent and a lubricant.

Furthermore, as an appropriate method in the field, using the method disclosed in Remington's Pharmaceutical Science, Mack Publishing Company, Easton PA, it may be preferably formulated depending on each disease or component.

The composition comprising *Weissella cibaria* WIKIM28 (Accession number KCCM11879P) or its culture as an active ingredient of the present invention may be used as a food composition or food additive composition for prevention or improvement of cancer.

The food composition may be a form of health functional food.

The "health functional food" means a food produced and processed using raw materials or ingredient having useful functions to human bodies in accordance with the Health Functional Food Act (Article 3, No. 1), and the "functionality" means to obtain useful effects for health uses such as regulating nutrients or physiological effects, and the like, on the structure and function of human bodies (same Article, No. 2).

The food composition may comprise a food additive additionally, and unless otherwise specified, the suitability as a "food additive" shall be determined according to the standards and criteria for the corresponding item in accordance with the General Rules and General Test Methods of the Food Additive Code approved by the Ministry of Food and Drug Safety.

The item listed in the "Food Additive Code" may include for example, chemical synthetic products such as ketones, glycine, potassium citrate, nicotinic acid, cinnamic acid, etc., natural additives such as Persimmon color, licorice extract, crystalline cellulose, guar gum, etc., and mixed formulations such as L-glutamine sodium formulations, alkali agents for noodles, preservative formulations, tar color formulations, etc.

The food comprising the active ingredient of the present invention may include confectionery such as bread, rice cakes, dried cakes, candies, chocolates, chewing gum and jam, ice cream produces such as ice cream, ice and ice cream powder, dairy products such as milk, low-fat milk, lactose degradation milk, processed milk, goat milk, fermented milk, butter milk, concentrated milk, milk cream, butter milk, natural cheese, processed cheese, powdered milk and whey, meat products such as processed meat products, processed egg products and hamburgers, fish meat products such as fish cakes, ham, sausage, bacon, etc., noodles such as ramen, dried noodles, fresh noodles, instant fried noodles, gelatinized dried noodles, improved cooked noodles, frozen noodles and pastas, beverages such as fruit juice beverages, vegetable beverages, soybean milk, *lactobacillus* beverages such as yogurt, etc., and mixed beverages, sauces such as soy sauce, soybean paste, red pepper paste, black soybean paste, mixed paste and vinegar, seasoning food such as tomato ketchup, curry and dressing, margarine, shortening and pizza, but not limited thereto.

In addition thereto, the composition of the present invention may comprise various nutrients, vitamins, electrolytes, flavoring agents, coloring agents, pectic acid and its salts, alginic acid and its salts, organic acids, protective colloid thickeners, pH adjusting agents, stabilizers, preservatives, glycerin, alcohols, carbonating agents used for carbonated beverages, and the like. Moreover, the composition of the present invention may comprise flesh for production of natural fruit juices, fruit juice beverages and vegetable beverages. These ingredients may be used independently or in combination.

The beverage composition comprising the active ingredient of the present invention has no special limitations for other components, and as common beverages, may contain an additional component such as various flavoring agents or natural carbohydrates, or the like. The example of the natural carbohydrates described above common sugars such as monosaccharides (for example, glucose, fructose, etc.); disaccharides (for example, maltose, sucrose, etc.); and polysaccharides (for example, dextrin, cyclodextrin, etc.), and sugar alcohols such as xylitol, sorbitol, erythritol, and the like. As a flavoring agent other than those described above, natural flavoring agents (thaumatin, *stevia* extracts (for example, rebaudioside A, glycyrrhizin, etc.)) and synthetic flavoring agents (saccharin, aspartame, etc.) are may be advantageously used.

In addition, the composition comprising *Weissella cibaria* WIKIM28 (Accession number KCCM11879P) or its culture as an active ingredient of the present invention may be used as a feed composition or feed additive composition for prevention or improvement of cancer of livestock.

When the composition is produced as a feed additive, the composition may be produced as high concentrate of 20 to 90% or in a powder or granule form. The feed additive may additionally comprise any one, or one or more of organic acids such as citric acid, fumaric acid, adipic acid, lactic acid, malic acid, etc., or phosphates such as sodium phosphate, potassium phosphate, acidic pyrophosphate, polyphosphate (polyphosphate), etc., or natural anti-oxidants such as polyphenol, catechin, alpha-tocopherol, rosemary extract, vitamin C, green tea extract, licorice extract, keto acid, tannic acid, phytic acid, etc. When produced as feed, the composition may be formulated in a common feed form, and may comprise common feed components together.

The feed and feed additive may further comprise grain, for example, powdered or crushed wheat, oat, barley, corn and rice; plant protein feed, for example, feed having rape, bean and sunflower as a main component; animal protein feed, for example, powdered blood, meat meal, bone dust and fish meal; sugars and dairy products, for example, dried components consisting of various kinds of powdered milk and milk serum powder, and the like, and in addition thereto, may further comprise a nutritional supplement, a digestion and absorption enhancer, a growth promoting agent, and the like.

The feed additive may be administered alone or administered in combination with other feed additive in an edible carrier to animals. In addition, the feed additive may be mixed as top-dressing or directly to animal feed, or easily administered to animals as a separate oral formulation from feed. When the feed additive is administered separately from animal feed, as well-known in the art, it may be produced as an immediate release or sustained release formulation, in combination to a pharmaceutically acceptable edible carrier. This edible carrier may be solid or liquid, for example, corn starch, lactose, sucrose, bean flake, peanut oil, olive oil, sesame oil and propylene glycol. When a solid carrier is used, the feed additive may be a tablet, capsule, powder, troche, lozenge, or non-dispersed form of top-dressing. When a liquid carrier is used, the feed additive may be a formulation of gelatin soft capsule, or syrup or suspension, emulsion or solution.

Furthermore, the feed and feed additive may contain a supplement, for example, a preservative, stabilizer, wetting agent or emulsifier, solution promoter, or the like. The feed additive may be used by adding it to animal feed by salivating, spraying or mixing.

The feed or feed additive of the present invention may be applied to many animal feeds including mammals, poultry and fish.

It may be used for pigs, cows, sheep, goats, experimental rodents and pets (e.g.: dogs, cats) in addition to experimental rodents, and the like, as the mammals, and may be used for chickens, turkeys, ducks, geese, pheasants, and quails, and the like, as the poultry, and may be used for trout, and the like as the fish, but not limited thereto.

In addition, the composition comprising *Weissella cibaria* WIKIM28 (Accession number KCCM11879P) or its culture as an active ingredient of the present invention may be used as a lactic acid bacteria starter for fermentation.

Example 1. Isolation and Culture of Strain

*Weissella cibaria* WIKIM28 (Accession No. KCCM11879P) was given from Microorganism and Gene Bank of World Institute of Kimchi to proceed the experiment.

The single colony of the given *Weissella cibaria* WIKIM28 was subcultured in an MRS agar medium at 30° C. for 48 hours, and then the culture single colony was 37° C. for 24 hours at 200 rpm after inoculating in an MRS liquid medium of 10 ml. After culturing, the strain cells were centrifuged at 8,000 rpm for 5 minutes to remove the culture solution and washed with PBS (Phosphate Buffered Saline) three times to remove the remaining medium components.

Example 2. Conditions of Experimental Animal (Mouse)

As an experimental animal used for the experiment, male 5-week-old BALB/c mice (Orient Bio, Korea) and C57BL/6 mice were supplied, and raised during the experiment period after a stabilization period of 1 week in an animal breeding room in an SPF environment where the room temperature of 20±2° C. and humidity of 55±15% were maintained. As a sample, a general pellet sample with no antibiotic was supplied and water was made available for ingestion frequently. For the experimental progression, all animals were bred, experimented and euthanized according to the protocol approved by the Animal Experimental Ethics Committee of World Kimchi Research. The observation of the change in tumor size was progressed by measuring the volume ($mm^3$) of the tumor using an equation of 3.14×(length×height×area)/6.

Example 3. Production of CT26 and MC38 Mouse Colorectal Cancer Cells Transplanted Animal Models 3-1. Cell Culture CT26 mouse colorectal cancer cells (Korean Cell Line Bank, Korea) were purchased and used, and MC38 mouse colorectal cancer cells (Chonnam National University, Medical college) were provided and used. These CT26 and MC38 mouse colorectal cancer cells were cultured under the conditions of 5% $CO_2$ and 37° C. in a DMEM medium (Hyclone, U.S.) containing 10% fetal bovine serum and 1% penicillin-streptomycin.

3-2. Production of Cell Transplanted Cancer Animal Model

For production of an animal model of CT26 cell transplantation, 6-week-old BALB/c mice (18-21 g) were used for experiment, and for production of an animal model of MC38 cell transplantation, 6-week-old C57BL/6 mice (18-21 g) were used. The cultured mouse colorectal cancer cells CT26 and MC38 were injected subcutaneously in the right thigh of the mice, after harvesting $1×10^5$ cell, respectively, and resuspending in PBS of 50 μl.

Example 4. Analysis of Anti-Tumor Effect of *Weissella cibaria* WIKIM28

4-1. Analysis of Anti-Tumor Effect in CT26 Cell Transplanted Animal Model

The *Weissella cibaria* WIKIM28 was intravenously injected to the tail of the CT26 cell transplanted mice in which tumor was formed in a volume of about 80~100 $mm^3$. The *Weissella cibaria* WIKIM28 was prepared by quantifying the number of bacteria in $1×10^{10}$ CFU/ml using PBS, and 0.1 ml ($1×10^9$ CFU) was injected intravenously into the experimental animal, and PBS was administered to the negative control group. The result of confirming the change in the colorectal cancer tumor size of the CT26 cell transplanted mice with naked eyes over time was shown in FIG. 1.

As shown in FIG. 1, it was observed that the tumor cells were reduced to a degree that could be seen with naked eyes, after 12 days, when the *Weissella cibaria* WIKIM28 was intravenously injected, compared to the negative control group (PBS).

Figure 2:
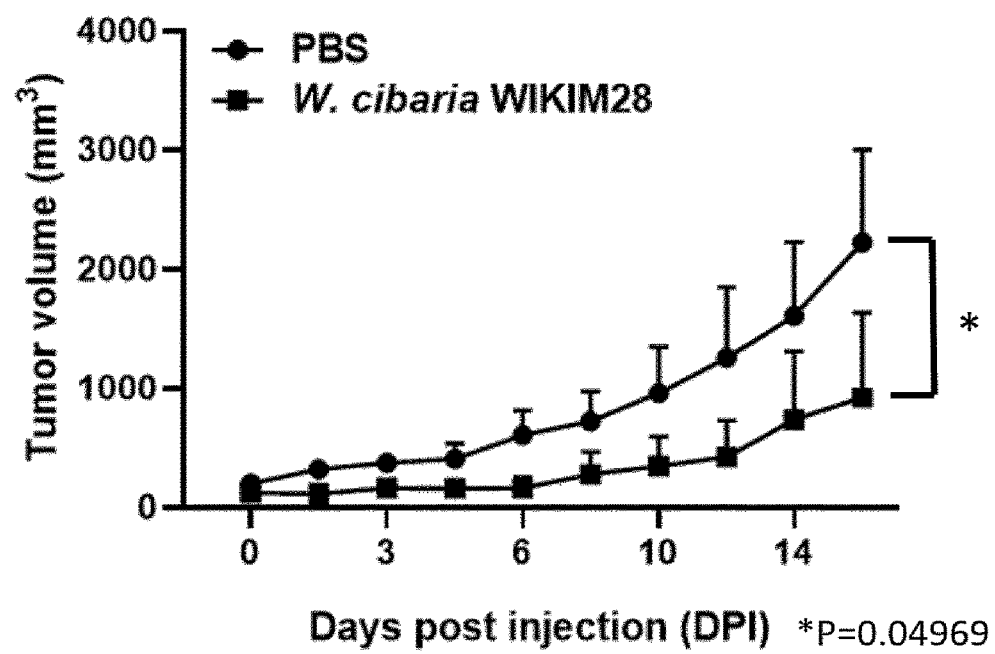
FIG. 2 is a drawing which shows a graph measuring the volume change over time after intravenous injection of the composition according to the present invention into CT26 cell transplanted mice as compared to the negative control group where phosphate buffered saline (PBS) was injected.

In addition, the result of measuring the volume change in tumor size in the CT26 cell transplanted mice over time was shown in FIG. 2.

As shown in FIG. 2, it was confirmed that in the colorectal cancer tumor size of the CT26 cell transplanted mice, there were about 2.4 times of anti-tumor effects, in 16 days, when the *Weissella cibaria* WIKIM28 was injected, compared to the negative control group Example 5. Biodistribution Study after Injection of *Weissella cibaria* WIKIM28

The *Weissella cibaria* WIKIM28 was intravenously injected to the tail of the CT26 cell transplanted mice in which tumor was formed in a volume of about 80~100 $mm^3$. The *Weissella cibaria* WIKIM28 was prepared by quantifying the number of bacteria in $1×10^{19}$ CFU/ml using PBS, and 0.1 ml ($1×10^9$ CFU) was injected intravenously to the tail of the experimental animal, and PBS was administered to the negative control group. The result of confirming the change in the colorectal cancer tumor size of the MC38 cell transplanted mice with naked eyes over time was shown in FIG. 3.

Figure 3:
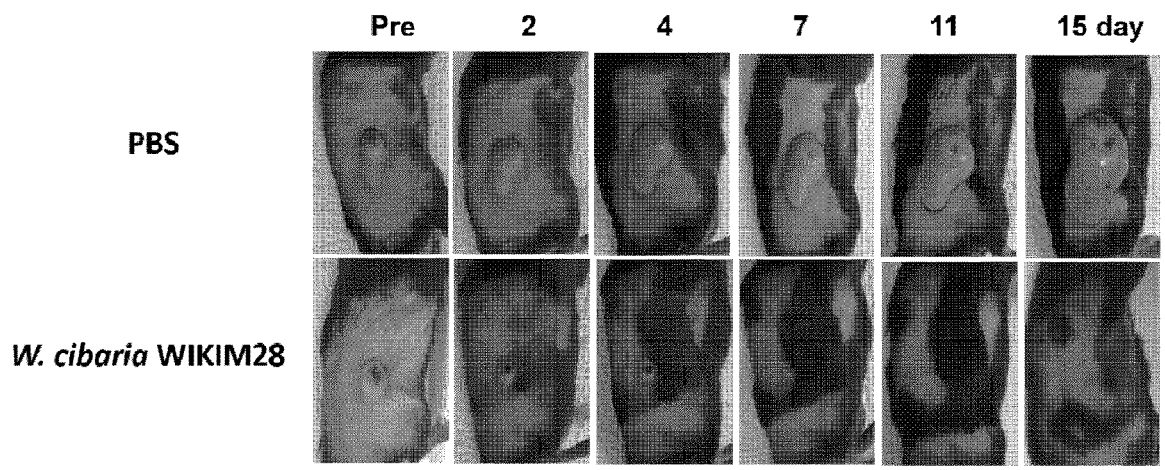
FIG. 3 is a drawing which shows a photograph of a tumor part of a mouse for observing that the size of tumor cells changes over time after intravenous injection of the composition according to the present invention into MC38 cell transplanted mice as compared to the negative control group where phosphate buffered saline (PBS) was injected.

As shown in FIG. 3, it could be observed that the tumor cells were reduced to a degree that could be seen with naked eyes, when the *Weissella cibaria* WIKIM28 was intravenously injected, compared to the negative control group (PBS). It was confirmed that the tumor was reduced to a degree that could not be seen with naked eyes after 15 days.

Figure 4:
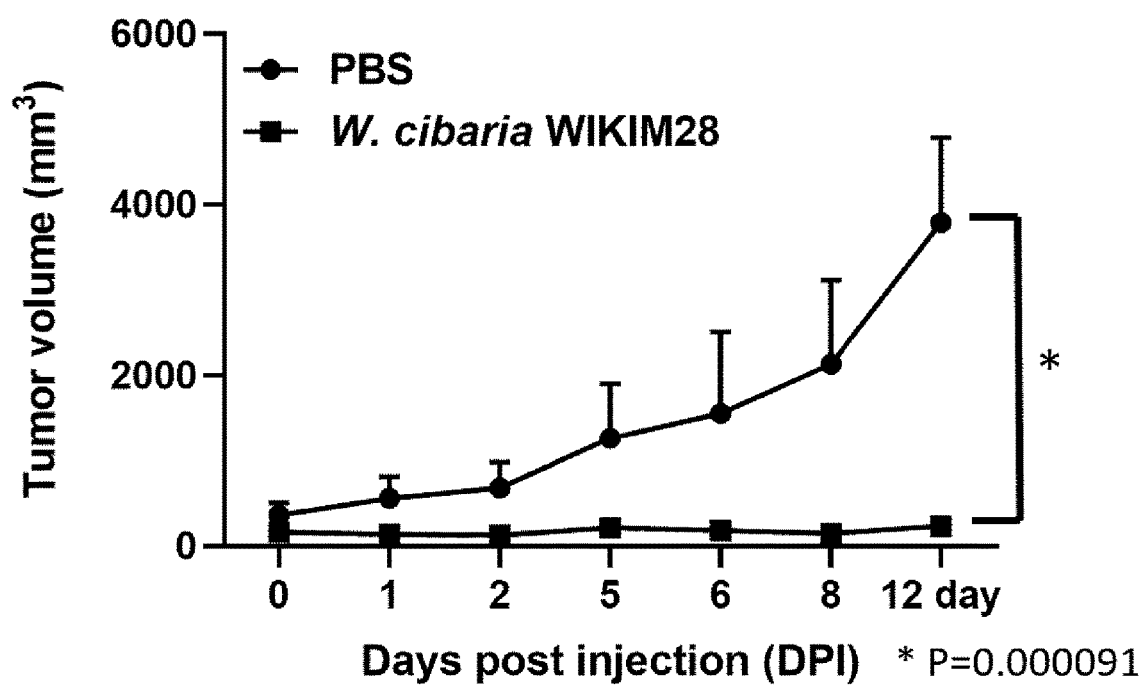
FIG. 4 is a drawing which shows a graph measuring the volume change over time after intravenous injection of the composition according to the present invention into MC38 cell transplanted mice as compared to the negative control group where phosphate buffered saline (PBS) was injected.
Figure 5:
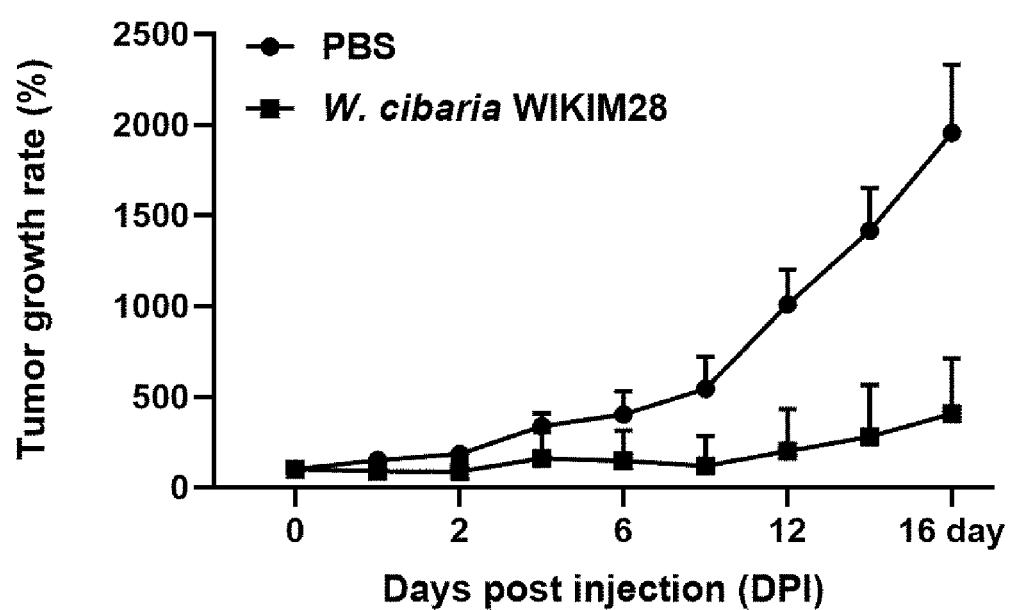
FIG. 5 is a drawing which shows a graph measuring the volume growth rate of tumor cells over time after intravenous injection of the composition according to the present invention into MC38 cell transplanted mice as compared to the negative control group where phosphate buffered saline (PBS) was injected.

In addition, the result of measuring the volume change in tumor size and volume growth rate in the MC38 cell transplanted mice over time was shown in FIG. 4 and FIG. 5.

As shown in FIG. 4 and FIG. 5, it could be confirmed that the volume in colorectal cancer tumor size and growth rate of the MC38 cell transplanted mice were rapidly reduced when the *Weissella cibaria* WIKIM28 was injected, compared to the negative control group, and it could be determined that there were about 16.3 times of anti-tumor effects in 12 days.

From the experimental result, the present inventors have confirmed that the anti-tumor effects of the *Weissella cibaria* WIKIM28 are excellent and therefore the application value is high as a composition for prevention, improvement and treatment of cancer.

*Weissella cibaria* WIKIM28 has been deposited to Korean Culture Center of Microorganisms at Yurim B/D 45, Hongjenae-2ga-gil, Seodaemun-gu, Seoul 120-861, Republic of Korea (international depositary authority under Budapest Treaty) under accession number KCCM11879P.

The invention claimed is:

1. A method of inhibiting growth of colorectal cancer cells, the method comprising administering an effective amount of a composition comprising *Weissella cibaria* WIKIM28 deposited under accession number KCCM11879P or its culture as an active ingredient to a subject in need thereof.

2. The method of claim 1, wherein the composition is administered by an oral administration or a parenteral administration.

3. The method of claim 2, wherein the parenteral administration is intravenous injection administration.

4. The method of claim 1, wherein the composition is in a living cell form.

* * * * *